Jan. 2, 1968   W. F. VIA, JR   3,361,414
MIXING APPARATUS
Filed Feb. 8, 1967   3 Sheets-Sheet 1

INVENTOR.
William F. Via, Jr.
BY
Harness, Dickey & Pierce
ATTORNEYS.

Jan. 2, 1968   W. F. VIA, JR   3,361,414
MIXING APPARATUS
Filed Feb. 8, 1967   3 Sheets-Sheet 2
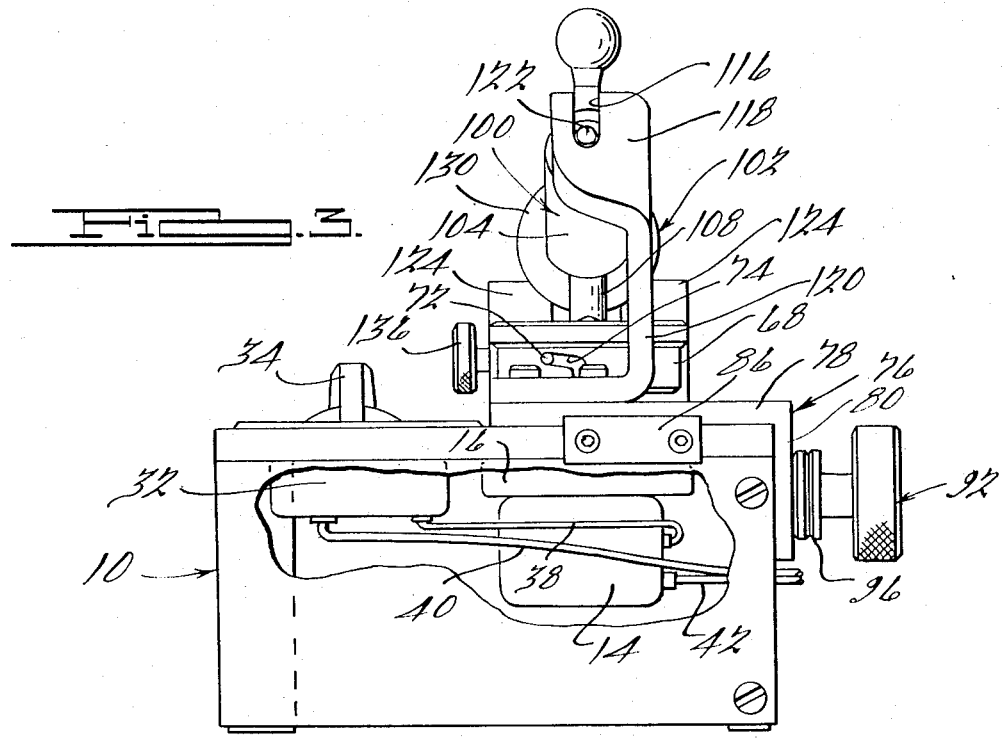
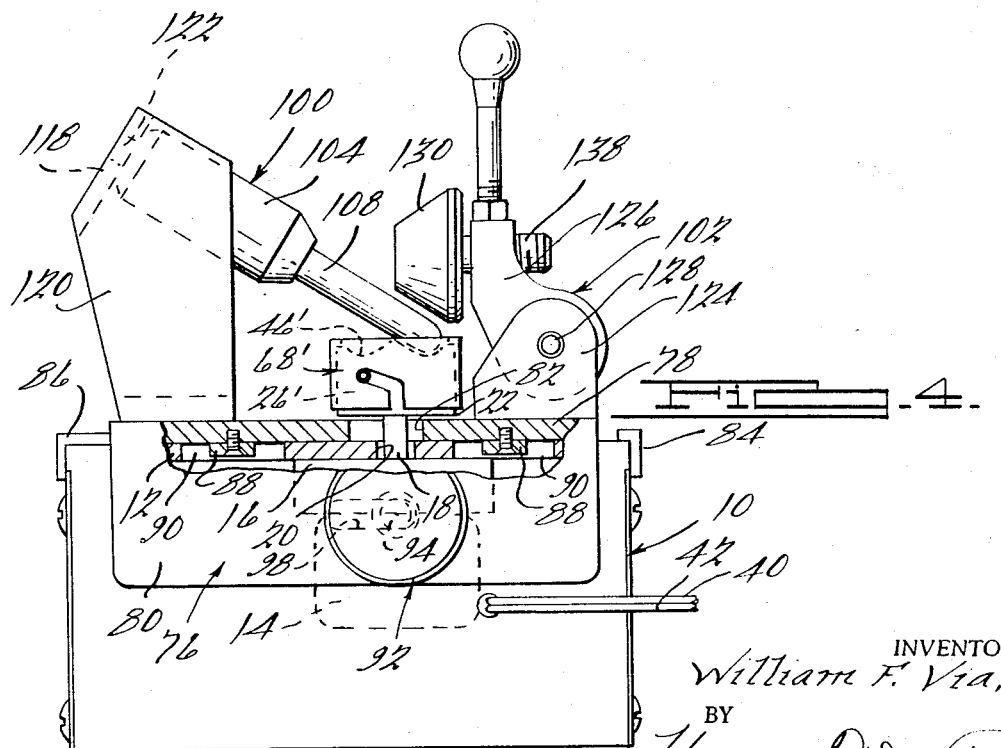
INVENTOR.
William F. Via, Jr.
BY
Harness, Dickey & Pierce
ATTORNEYS.

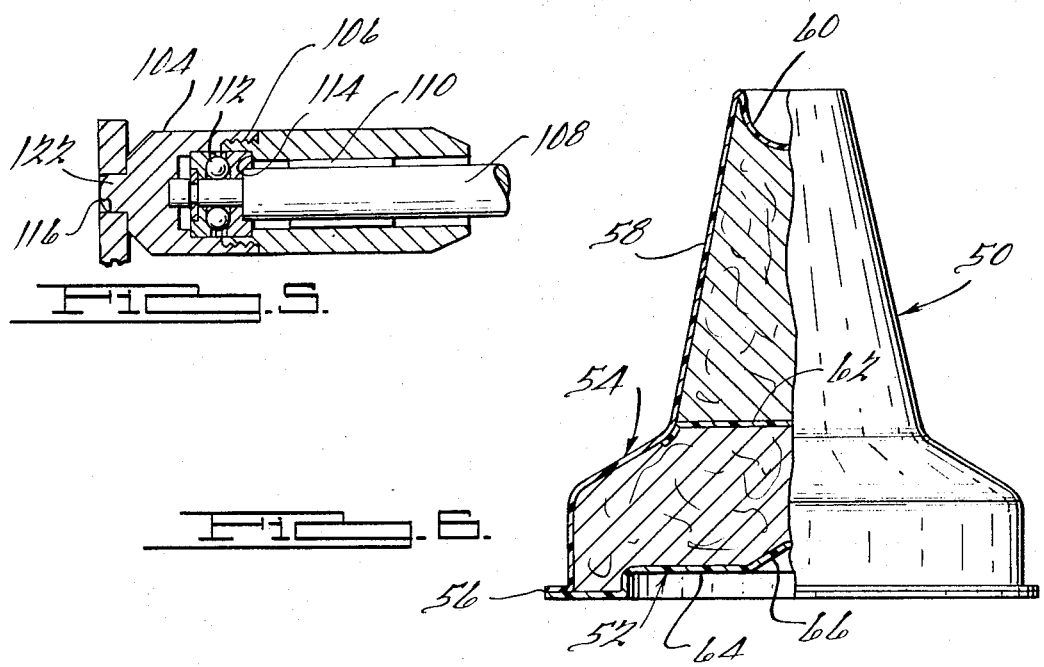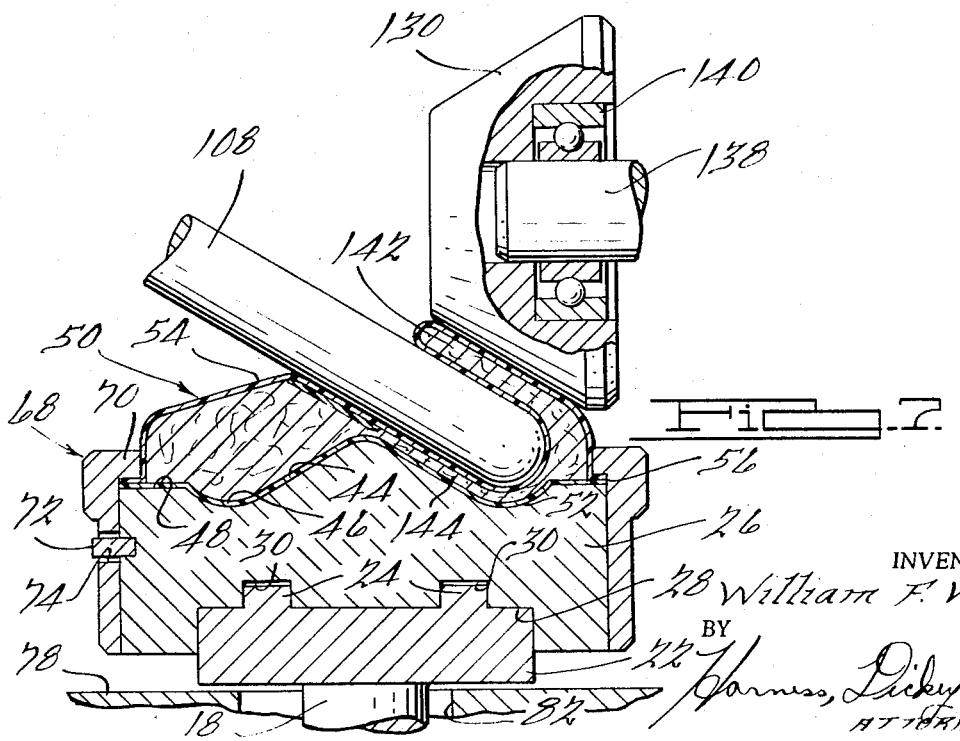

United States Patent Office 3,361,414
Patented Jan. 2, 1968

3,361,414
MIXING APPARATUS
William F. Via, Jr., 464 Chalfonte,
Grosse Pointe Farms, Mich. 48236
Filed Feb. 8, 1967, Ser. No. 614,657
8 Claims. (Cl. 259—72)

ABSTRACT OF THE DISCLOSURE

A mixing apparatus for mixing the contents of compartmentalized containers including a rotatable mortar having a conical base on which the container is mounted and an agitator rod having an end portion adapted to be disposed within the container and extend to a point adjacent to the periphery thereof for imparting a turbulence to the container contents in response to rotation of the mortar.

Background of the invention

The present invention broadly relates to mixing devices, and more particularly, to a novel mixing apparatus for uniformly mixing or blending the components contained within a compartmentalized flexible dish-shaped container. More specifically, the present invention is directed to a mixing device which is particularly adaptable for admixing a plurality of components in disposable compartmentalized containers of the general type disclosed in United States Patent No. 3,100,045, granted Aug. 6, 1963, for "Mixing Containers."

Compartmentalized containers of the general types disclosed in the aforementioned United States patent overcome the tedious and time-consuming labor and inconvenience associated with the preparation of adhesives, dental impression materials or the like, immediately prior to their use. In epoxy adhesive systems, for example, a measured proportion of the resin constituent must be uniformly admixed with an accurate quantity of the activator constituent and the resultant blend must thereafter be quickly used before the curing reaction progresses appreciably. Similarly, in material used for making dental impressions, it has heretofore been conventional to mix measured quantities of the base material with an accelerator immediately prior to use. The base materials employed for dental impressions usually comprise rubber elastomers, silicon base materials, zinc oxide and eugenol. These materials are conventionally of a heavy paste-like consistency and present great difficulty in effecting a uniform mixture with the accelerator constituent to assure that the resultant mixture possesses the requisite curing characteristics and that the resultant cured resin is of the proper physical and chemical properties.

Compartmentalized containers of the general types disclosed in the aforementioned United States Patent No. 3,100,045 comprise a container including a flexible outer skin and an interior which is separated into two or more individual compartments by rupturable membranes or diaphragms. The materials within the compartmentalized container are retained in a separated condition until prior to use, at which time the membranes are ruptured and the container is kneaded or otherwise worked so as to effect a blending of the constituents therein. At the completion of the blending operation, the exterior skin of the container is punctured or cut, enabling the blended mixture to be extruded therefrom either directly on the surface to which it is applied or into a suitable syringe for subsequent application.

It will be apparent that such compartmentalized containers have overcome the tedious, time-consuming and otherwise messy task of admixing the constituents of multiple component systems in accordance with the prior practice wherein the several constituents were individually supplied in separate containers. Such compartmentalized containers further enable more accurate proportioning of the several constituents of the multiple component system which are supplied in pre-measured compartmentalized containers and further enable the blending of the constituents to be accomplished without exposure to the atmosphere, thereby eliminating the evolution of any malodorous fumes and gases which is conventionally encountered when the several constituents are blended in an open container.

Summary of the invention

The principal object of the present invention is to provide a novel mixing apparatus which further enhances the convenience of use of such compartmentalized containers and assures more uniform and quicker blending of the constituents contained therein than has heretofore been possible employing manual means; is readily adaptable for uniformly blending the constituents of compartmentalized containers of different sizes; is of a construction such that none of the operating parts come in direct contact with the materials to be mixed completely eliminating any cleaning of the components after each mixing cycle; and is of simple design, of durable construction and of economical manufacture and use.

The foregoing and other objects and advantages of the present invention are achieved by a mixing apparatus for compartmentalized flexible dish-shaped containers including a base on which a turntable is rotatably mounted, which is drivingly coupled to suitable power means for effecting rotation thereof for preselected time intervals. In accordance with a preferred construction of the present invention, the turntable is adapted to removably receive a series of different sized mortars which are arranged so as to receive the base portion of a container thereon. Suitable retaining means are included for removably clamping a container to be mixed on the mortar. Agitator means are also incorporated on the base including a rotatable rod which is disposed with its longitudinal axis angularly intersecting the axis of rotation of the turntable and with the end portion thereof projecting radially of the mortar to a point adjacent to the periphery thereof. In addition, compressing means are included which are positionable with an engaging face thereof in spaced overlying relationship relative to the end portion of the rod and in which position it is adapted to engage the periphery of a container mounted on the mortar. During a mixing operation, the end portion of the rod is adapted to be disposed in deforming relationship and enveloped within the skin of a container for concurrently rupturing the diaphragms defining the compartmentalized structure thereof, as well as imparting turbulence and a kneading action to the constituents therein, in response to rotation of the turntable and the container relative thereto. In accordance with a preferred embodiment of the present invention, suitable timing means are incorporated in the power supply system for maintaining the turntable energized for a preset type interval consistent with the size of the compartmentalized container and/or the nature of the constituents therein to assure uniform blending of the multiple component system.

Brief description of the drawings

Other objects and advantages of the present invention will become apparent upon a reading of the following description taken in conjunction with the accompanying drawings, wherein:

FIGURE 3 is a side elevational view with portions thereof broken away for exposing the interior of the mixing apparatus illustrated in FIGURE 1;

FIGURE 4 is a front elevational view similar to that of FIGURE 1, illustrating the disposition of the mixing rod to accommodate a mortar having a smaller diameter than the mortar as illustrated in FIGURE 1;

FIGURE 5 is a magnified fragmentary longitudinal sectional view of the upper end portion of the mixing rod assembly as viewed in FIGURE 1 and taken along the line 5—5 thereof;

FIGURE 6 is an enlarged side elevational view, partly in section, of a typical compartmentalized container; and FIGURE 7 is a fragmentary enlarged side elevational view, partly in section, illustrating the configuration of a compartmentalized container and the mixing rod during an actual mixing cycle of the constituents within the container.

*Description of the preferred embodiment*

Figure 1:
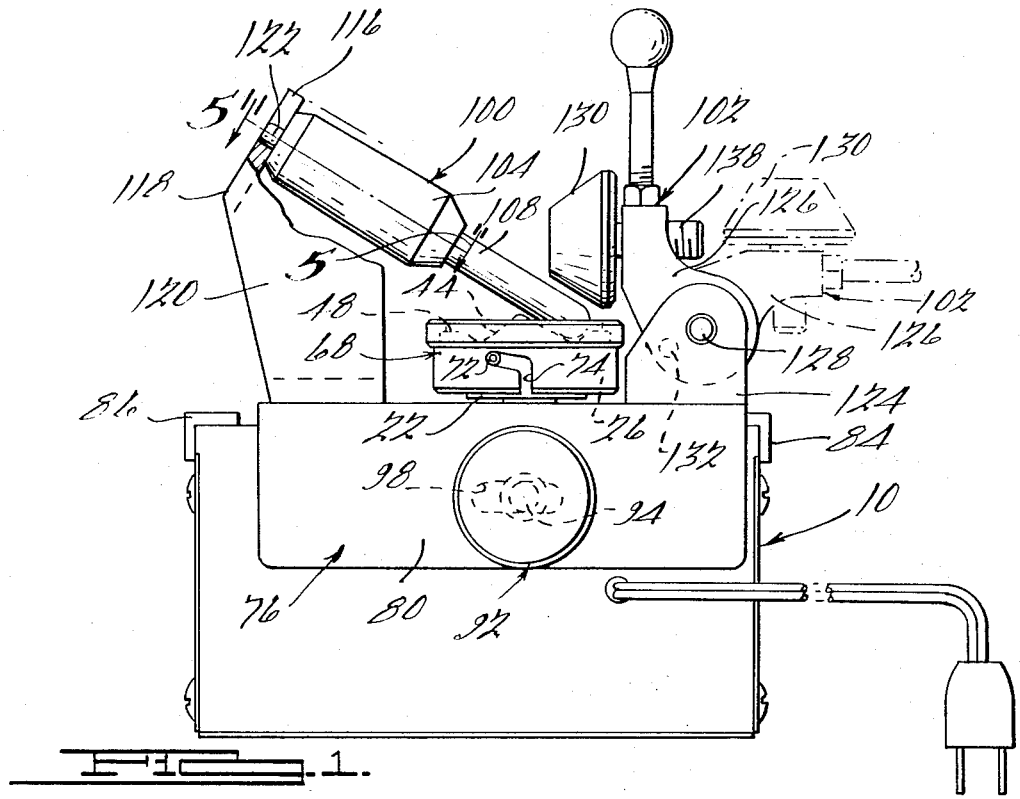
FIGURE 1 is a front elevational view of a mixing apparatus constructed in accordance with the preferred embodiments of the present invention.
Figure 2:
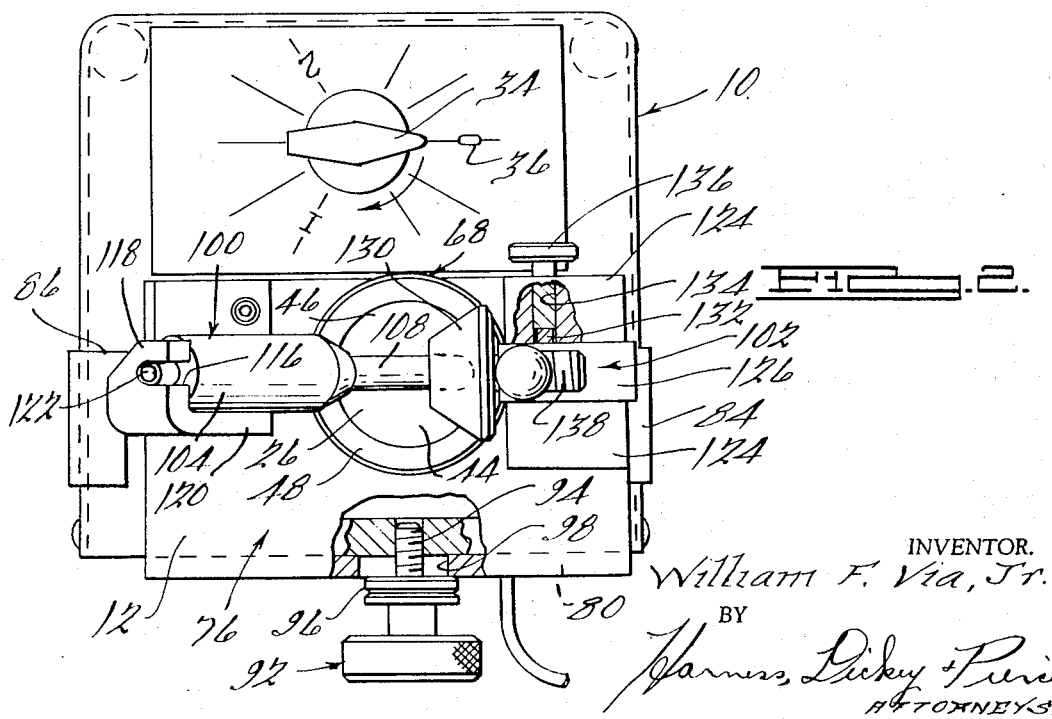
FIGURE 2 is a plan view, partially in section, of the mixing apparatus illustrated in FIGURE 1.

Referring now in detail to the drawings, and as may be best seen in FIGURES 1–3, a mixing apparatus constructed in accordance with the preferred embodiment of the present invention comprises a base or housing 10 forming a three dimensional enclosure including a flat top panel 12, which serves as the mounting platform for the operative components of the mixing apparatus. Suitable drive means such as an electric motor 14, as best seen in FIGURE 3, is mounted within the interior of the housing 10 and to the underside of the top panel 12. The electric motor 14 is drivingly coupled to a suitable transmission or gear reducer 16 having an upright driven shaft 18 which projects upwardly through an aperture 20 in the top panel 12, as best seen in FIGURE 4. A turntable 22 is affixed to the upper end of the driven shaft 18 as shown in FIGURE 7, which incorporates a plurality of engaging dogs 24 projecting upwardly from the upper face thereof.

A motar 26, as may be best seen in FIGURE 7, is adapted to be removably positioned on the turntable 22 and incorporates a cylindrical recess indicated at 28 in the base thereof as well as a pair of inwardly directed apertures 30 which are adapted to overlie the engaging dogs 24 on the turntable for transmitting torque thereto.

In accordance with a preferred embodiment of the present invention, the electric motor 14 is electrically connected through a suitable timer switch 32 as best seen in FIGURE 3, which incorporates a pointer knob 34 that is accessible on the upper face of the top panel 12. The pointer knob 34 and the timer switch 32 connected thereto is readily presettable by an operator by simply rotating the pointer knob in a clockwise direction as viewed in FIGURE 2 to effect energization of the electric motor 14 for a preset time period. For this purpose suitable indicia indicated at 36 are imprinted or otherwise embossed on the top panel 12 adjacent to the pointer knob as shown in FIGURE 2, which may suitably be calibrated in terms of units of time such as minutes, for example, whereby energization of the motor 14 and corresponding rotation of the turntable 22 and the mortar 25 thereon, will continue for a preset time period to assure the attainment of a uniform mixture of the several constitutents contained in a compartmentalized container. The timer switch 32 is wired in series with the motor 14 by means of wire 38 as shown in FIGURE 3, as well as supply conductors 40 and 42 which are electrically connected to a suitable electrical power source.

The mortar 26, as best seen in FIGURE 7, comprises a substantially cylindrical member having an upper mounting face which includes a symmetrical centrally disposed conical surface 44 which terminates in an arcuate groove 46 which in turn terminates in a substantially flat annular surface 48. The aforementioned contoured upper face surface of the mortar 26 is intended to serve as a supporting base for a compartmentalized container 50 of a type as illustrated in FIGURE 6.

As best seen in FIGURE 6, the container 50 comprises a dish-shaped bottom portion 52 and a dish-shaped upper portion 54 which are heat sealed or otherwise secured to each other to form a liquid-tight juncture and terminate in a composite web indicated at 56. The upper portion 54 of the container is formed with a conical section 58 which terminates with an inwardly directed rounded end 60. The interior of the conical section 58 is separated from the interior of the container disposed therebelow by means of a rupturable membrane or diaphragm 62 which is heat sealed, adhered or otherwise suitably affixed to the inner surface of the dish-shaped upper portion at a point adjacent to the base of the conical section 58.

The interior of the conical section 58 is conveniently filled with a suitable constituent such as an activator, for example, while the portion below the diaphragm 62 is filled with a suitable base material such as an epoxy resin, for example, which remain separated until such time that the use of the contents is desired. At that time, the rupturable diaphragm 62 is broken enabling an intermingling of the contents of the two compartments and a blending thereof in a manner subsequently to be described. As will be noted in FIGURE 6, the base of the container 50 as defined by the dish-shaped bottom portion is contoured with an inwardly directed depression 64 terminating at its center position with an inwardly inclined conical portion 66 which enables the base of the container to extend in intimate contact over the upper face of the mortar 26 assuming a position as best seen in FIGURE 7.

The container 50 may be constructed of any suitable flexible material to enable deformation thereof of which plastic materials, such as polyethylene, polypropylene or other readily heat sealable resins of the types well known in the art are particularly satisfactory. The rupturable diaphragm 62 is also of a flexible material which is of a strength to maintain integrity of the compartmentalized construction of the container during normal handling and filling of the container but to enable a rupture thereof as a result of deformation of the diaphragm during the initiation of the mixing operation.

The mounting of the container 50 on the upper face of the mortar 26 and the retention of the container in appropriate position thereon is achieved by means of a retainer ring 68 which is of a generally cylindrical and tubular configuration including an inwardly directed annular flange 70 which is adapted to overlie the composite web 56 of the container and effect a clamping thereof to the face of the mortar as best seen in FIGURE 7. Retention of the retainer ring 68 on the mortar 26 is achieved by the coaction between a plurality of pins 72 projecting axially of the periphery of the mortar which are adapted to coact with the side edges of L-shaped grooves or slots 74 formed at circumferentially spaced intervals around the retainer ring 68. The horizontally disposed portion of the L-shaped slots 74 as is best seen in FIGURE 1 is angularly inclined relative to a plane disposed perpendicular to the axis of the retainer ring so as to provide a camming action with the pins 72 effecting a further clamping of the composite web between the annular flange 70 and the flat annular surface 48 on the face of the mortar. The retainer ring 68 is simply installed on the mortar by aligning the outlet ends of the L-shaped slots 74 with the pins 72 and thereafter axially sliding the retainer ring over the periphery of the mortar followed by subsequent relative rotation of the retainer ring with respect to the mortar effecting firm clamping of a container 50 on the upper face of the mortar.

The mixing apparatus, as disclosed in the drawings, is constructed in accordance with a preferred embodiment wherein mortars of different diameter can be inserted on the turntable so as to enable the blending of the constituents in containers which are of different size. Adjustability of the operating components to accommodate mortars of different size is achieved by means of a slide member 76 which includes a base flange 78 overlying the upper surface of the top panel 12 and a depending flange 80 affixed to one edge thereof which slidably overlies the side surface of the housing 10 as best seen in FIGURES 2, 3 and 4. The base flange 78 is formed with an elongated aperture 82 through which the driven shaft 18 of the gear reducer extends providing for unobstructed rotation thereof. In the exemplary embodiment shown in the drawings, the slide member 76 is adjustably movable to and from a first position as shown in FIGURES 1 and 2, wherein the right-hand end portion thereof is disposed in abutting relationship against a stop member 84 to a second position as shown in FIGURE 4 wherein the left-hand portion of the slide member is disposed in abutting relationship against the edge of a stop member 86. Guided movement of the slide member on the top panel 12 between the two positions is achieved by means of the coaction of keys 88, as shown in FIGURE 4, which are affixed to the underside of the base flange 78 and are disposed in sliding bearing relationship against the side edges of elongated key slots 90 formed in the top panel 12.

A securing of the slide member 76 in either of its two moved positions to prevent inadvertent movement thereof is achieved by means of a clamping knob 92, as best seen in FIGURES 1 and 2, which includes a threaded shank 94 which is threadably engaged in a suitable bore in the side wall of the housing 10, and is formed with a clamping flange 96 which is adapted to be disposed in bearing clamping relationship against the outer surface of the depending flange 80. As will be best seen in FIGURES 1 and 2, the depending flange 80 is formed with an elongated slot 98 to provide access of the threaded shank 94 therethrough in all moved positions of the slide member. The slide member is simply adjusted by loosening the clamping knob 92 so as to release the frictional engagement between the inner surface of the depending flange 80 and the exterior surface of the side wall of the housing 10 enabling appropriate positioning of the slide member against either of the two stops 84, 86. Thereafter, the clamping knob is again tightened locking the assemblies in appropriate adjusted position.

Mixing of the constituents within the container in response to rotation of the container mounted on the mortar is achieved by an agitator rod assembly indicated at 100 and a roller assembly indicated at 102. The agitator rod assembly 100, as shown in the drawings, comprises a body portion 104 comprising two tubular halves which are threadably connected to each other by means of coacting threads 106, as best seen in FIGURE 5 and a cylindrical rod 108 which is rotatably and guidably supported in the body portion 104. Suitable antifriction means such as needle bearings 110 are incorporated within the body portion 104 and are adapted to rollingly engage the periphery of the rod 108. In addition, a ball-type thrust bearing 112 is affixed to the inward end of the rod 108 and is adapted to bear against a shoulder 114 formed within the interior of the body portion 104 to prevent unwanted longitudinal movement of the rod relative to the body portion.

The agitator rod assembly is supported in an appropriate angularly inclined position wherein the end portion of the rod 108 is disposed with its longitudinal axis angularly intersecting the axis of rotation of the turntable and the mortar mounted thereon and with the rounded end portion thereof projecting radially of the mortar to a point adjacent to the periphery thereof. This relationship is best seen in FIGURE 7 wherein it will be noted that the periphery of the lower end portion of the rod 108 is disposed substantially parallel to the conical surface 44 of the mortar and with the rounded end thereof paralleling the surface of the arcuate groove 46. Retention of the agitator rod assembly 100 in this position is achieved at its upper end by means of a vertically disposed slot 116 formed in a web 118 of a support bracket 120 mounted on the slide member 76. The body portion 104 of the agitator rod assembly is formed with an axially extending pin 122 which is adapted to be removably received in the slot 116 of the support bracket 120.

The lower end portion of the agitator rod assembly during a mixing operation is maintained in appropriate position by means of suitable compressing means comprising the roller assembly 102 which is adapted to overlie the lower end portion of the rod 108 and is adapted to be disposed in contact with the periphery of the skin of a container being mixed. The roller assembly 102, as is best shown in FIGURES 1, 2 and 7, comprises a pair of spaced-apart upstanding flanges 124 affixed to the upper surface of the slide member 76. A lever 126 is pivotally mounted between the flanges 124 by means of a pivot pin 128 and is movable from an operative position as shown in solid lines in FIGURE 1, wherein the face of a conical roller 130 is disposed adjacent to the rod 108, to an inoperative position, as shown in phantom, angularly spaced therefrom. Retention of the lever 126 and the conical roller 130 thereon in an operative position is achieved by means of a resiliently biased pin 132 carried by the lever 126 which is adapted to move to a projected position as shown in FIGURE 2 when the lever is in the operative position and wherein the projecting end thereof is disposed in interlocking engagement in a bore 134 formed in one of the flanges 124, as best seen in FIGURE 2. A release of the lever 126 to enable pivoting movement thereof to the inoperative position is achieved by a release knob 136 slidably disposed in the bore 134 which is manually depressed inwardly as viewed in FIGURE 2, effecting movement of the pin 132 to a position wherein its projecting end is disposed in the plane of the adjacent face of the lever 126 thereby enabling relative pivoting movement of the lever with respect to the flanges.

The conical roller 130, as is best seen in FIGURES 1 and 7, is rotatably supported on a shaft 138 which is threadably secured to the upper portion of the lever 126. The projecting end of the shaft 138 is provided with suitable antifriction means such as ball bearing 140 facilitating rotation of the conical roller when disposed in contact with the periphery of a container being mixed.

It will be noted that the agitator rod assembly 100 and the roller assembly 102 are both mounted on the slide member 76 such that they move in unison between the two adjusted positions of the slide member. In accordance with this arrangement the relative disposition between the end portion of the rod 108 and the bearing surface of the conical roller 130 remains constant regardless of the position of the slide member. In this connection, it will be noted in FIGURE 1 that the end portion of the rod relative to the upper surface of the mortar and the conical face of the roller 130 corresponds to the mixing position, as illustrated in FIGURE 7. Similarly, when the slide member is moved to the other position wherein it is in contact with the stop member 86 corresponding to the position illustrated in FIGURE 4, the rod member and roller are also in appropriate position relative to a mortar of smaller diameter indicated at 26' having a retainer ring 68' around the upper edge thereof. In both positions of the slide member and with either of the mortars 86 or 86' the end portion of the mixing rod 108 is disposed substantially parallel to the conical face surface on the mortar and with the rounded end of the rod disposed symmetrically relative to the arcuate groove 46, 46' adjacent to the periphery thereof.

In accordance with the foregoing arrangement, the operation of the mixing apparatus is initiated with the roller assembly in the inoperative position and with the agitator rod assembly removed from the support bracket.

A container 50 with the constituents to be mixed, is first inserted through the retainer ring and thereafter the retainer ring is securely clamped in overlying relationship on a mortar of the appropriate size which in turn is placed on the turntable. The slide member is adjusted, if necessary, to the proper position to accommodate that specific mortar. The end portion of the rod of the agitator rod assembly is thereafter inserted downwardly into the rounded end 60 (FIGURE 6) of the container and further deformation of the container occurs as the rod is thrust downwardly and angularly toward the peripheral edge of the lower compartment thereof during the course of which movement the rupturable diaphragm 62 is punctured. The agitator rod assembly is then oriented such that the pin 122 is disposed in supporting relationship in the slot 116 of the support bracket 120 and the roller assembly is thereafter moved from the inoperative position shown in phantom in FIGURE 1 to the operative position shown in solid lines.

A typical configuration of a container in the deformed condition prior to and during the mixing operation is illustrated in FIGURE 7. The electric drive motor 14 is thereafter energized preferably by means of the timer switch 52 whereby the turntable, the mortar thereon, and the container clamped thereover are rotated for a preset time interval so as to achieve a substantially uniform blending of the several constituents in the container consistent with their viscosity and mixing characteristics. During the course of the rotation of the mortar, the material within the skin or envelope defining the exterior of the container is kneaded and agitated in response to rotation thereof and is extruded between the area 142 as indicated in FIGURE 7, as defined by the clearance between the periphery of the rod and the conical face of the roller 130 as well as the area indicated at 144 as defined by the clearance space between the periphery of the rod and the conical surface of the mortar 26. The kneading and turbulence imparted to the constituents effects substantially uniform admixture of the constituents within a relatively short time period. During the course of the revolution of the mortar and turntable, the conical roller 130 rotates in response to contact with the periphery of the container while the rod 108 rotates due to the different engaging effect of the peripheral portion of the exterior skin of the container in which it is enveloped preventing the imposition of excessive strains on the container envelope which might otherwise cause an inadvertent rupture thereof.

It will be understood that the embodiment of the mixing apparatus as hereinbefore described is applicable to mixing apparatuses wherein a plurality of mortars, agitator rod assemblies, and roller assemblies are mounted on a common base to provide for concurrent mixing of a plurality of containers.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a mixing apparatus for blending a plurality of constituents incorporated in an internally rupturable compartmentalized flexible dish-shaped container, the combination comprising a base, a turntable rotatably mounted on said base, drive means for rotating said turntable, a dish-shaped mortar mounted on said turntable for supporting the base portion of a container thereon, retainer means for removably clamping a container on said mortar for rotation therewith, agitator means removably supported on said base including a rotatable rod disposed with the longitudinal axis thereof angularly intersecting the axis of rotation of said turntable and with the end portion of said rod projecting radially of said mortar to a point adjacent to the periphery thereof, and compressing means on said base and positionable with an engaging face thereof in spaced overlying relationship relative to said end portion of said rod for engaging the periphery of a container on said mortar, said end portion of said rod adapted to be disposed in deforming relationship and enveloped within a container for rupturing the compartmentalized structure thereof and agitating the constituents therein in response to rotation of said turntable.

2. The mixing apparatus as defined in claim 1 wherein said mortar is removably mounted on said turntable and is interchangeable with mortars of different sizes to accommodate different sizes of containers.

3. The mixing apparatus as defined in claim 1 wherein said retainer means comprises a retainer ring for encircling the periphery of said mortar and for removably clamping a peripheral edge of a container therebetween.

4. The mixing apparatus as defined in claim 1 wherein said mortar is formed with an upwardly extending conical face disposed symmetrically about the axis of rotation of said mortar, said conical face disposed substantially parallel to the periphery of said end portion of said rod in overlying relationship thereto.

5. The mixing apparatus as defined in claim 1 wherein said compressing means comprises a roller rotatably mounted on said base and said engaging face comprises a conical surface on the periphery of said roller and positionable in spaced substantially parallel relationship relative to the periphery of said end portion of said rod.

6. The mixing apparatus as defined in claim 1 wherein said drive means further includes timer means for maintaining said drive means energized for a preselected time interval.

7. The mixing apparatus as defined in claim 1 wherein said agitator means comprises a body in which said rod is rotatably and guidably mounted, said body formed with engaging means thereon for removably supporting said agitator means on said base.

8. The mixing apparatus as defined in claim 1 wherein supporting means for said agitator means and said compressing means are disposed in a fixed spaced relationship and are adjustably positionable in a plane perpendicular to the axis of rotation of said mortar relative to said mortar for maintaining a fixed operative relationship when using mortars of different sizes.

References Cited

UNITED STATES PATENTS

| | | | |
|---|---|---|---|
| 1,857,863 | 5/1932 | Pervier | 259—72 |
| 2,336,438 | 12/1943 | Evans | 259—72 |
| 2,808,239 | 10/1957 | Reiffen | 259—84 X |
| 3,332,670 | 7/1967 | Swartz | 259—72 X |

ROBERT W. JENKINS, *Primary Examiner.*